Sept. 24, 1946.　　　　F. W. HENKE　　　　2,407,985
MACHINE TOOL
Filed Aug. 13, 1943　　　3 Sheets-Sheet 3

INVENTOR
Frederick W. Henke
BY
ATTORNEYS

Patented Sept. 24, 1946

2,407,985

UNITED STATES PATENT OFFICE 2,407,985

MACHINE TOOL

Frederick W. Henke, Philadelphia, Pa., assignor to Fox Products Company, Philadelphia, Pa., a corporation of Pennsylvania Application August 13, 1943, Serial No. 498,513

4 Claims. (Cl. 90—20)

This invention relates to machine tools and is particularly concerned with a machine tool of the type adapted to work small metal pieces, for instance to size such pieces, to remove burrs therefrom, and the like.

One of the primary objects of the invention is to provide a machine of this general type equipped with a carrier wheel having stations for the reception of work pieces to be carried past a cutter or other working element, the machine incorporating a novel and advantageous arrangement of devices for accurately positioning the work pieces in the stations of the carrier wheel, and holding the work pieces in their stations during the time they pass the cutter or other working element.

With the foregoing general purpose in mind, the invention contemplates employment of a rotative member, advantageously a disc, the peripheral edge of which is adapted to contact and ride on the periphery of the carrier wheel, the stations in the carrier wheel being arranged so that the work pieces are held in said stations by the rotative member during the time the pieces are actually being worked or machined.

Another important object of the invention is the provision of guide means in advance of the cutter and also in advance of the retaining disc, whereby to laterally position the work pieces prior to engagement of the cutter and retaining disc. The invention contemplates that the arrangement of these parts is such that the retaining disc engages the work pieces prior to movement thereof out of the delivery end of the guide.

Another feature of importance is the disposition of the carrier wheel, retaining disc and cutter with their axes all paralleling each other and preferably lying substantially in a common plane which is inclined with respect to the horizontal, the axis of the retaining disc occupying the highest position of the three. At the same time it is contemplated that the carrier wheel be exposed for ready insertion of work pieces in the several stations in a zone where the stations are moving upwardly, the cutter being located beyond the high point of the carrier wheel. The features just mentioned cooperate in providing for initial retention of the work pieces in their stations by the action of gravity, and also for engagement of the retaining disc with the work pieces in a zone in advance of that point at which the work pieces would tend to drop out of their stations by the action of gravity. It is also of advantage that the carrier wheel is arranged to discharge finished pieces in the zone in which gravity will assist discharge.

According to another feature of the invention, a trough is provided adjacent the carrier wheel in the zone in which the wheel is exposed for insertion of pieces in the stations, the trough being shaped to receive misplaced or inadvertently dropped pieces and to deflect such pieces away from the machine, and especially away from the zone of discharge of finished pieces, in order to avoid commingling of unfinished and finished pieces.

Still another advantage of the machine of this invention is the arrangement of the carrier wheel and the mounting thereof in a manner providing for ready removal and replacement of the wheel, this being of importance in order to adapt the machine to the handling of various different parts to be worked, many of such varying parts naturally requiring a carrier wheel having differently arranged or shaped stations.

A novel arrangement of carrier wheel drive is also employed in accordance with this invention. This drive is adjustable to accommodate drive gearing of different speed ratios, and the drive further incorporates a torque limiting device providing against damage to the machine in the event of misplacement of a work piece on the carrier wheel and consequent jamming.

How the foregoing objects and advantages are attained, together with others which will occur to those skilled in the art will be apparent from the consideration of the following description referring to the accompanying drawings in which—

Figure 1:
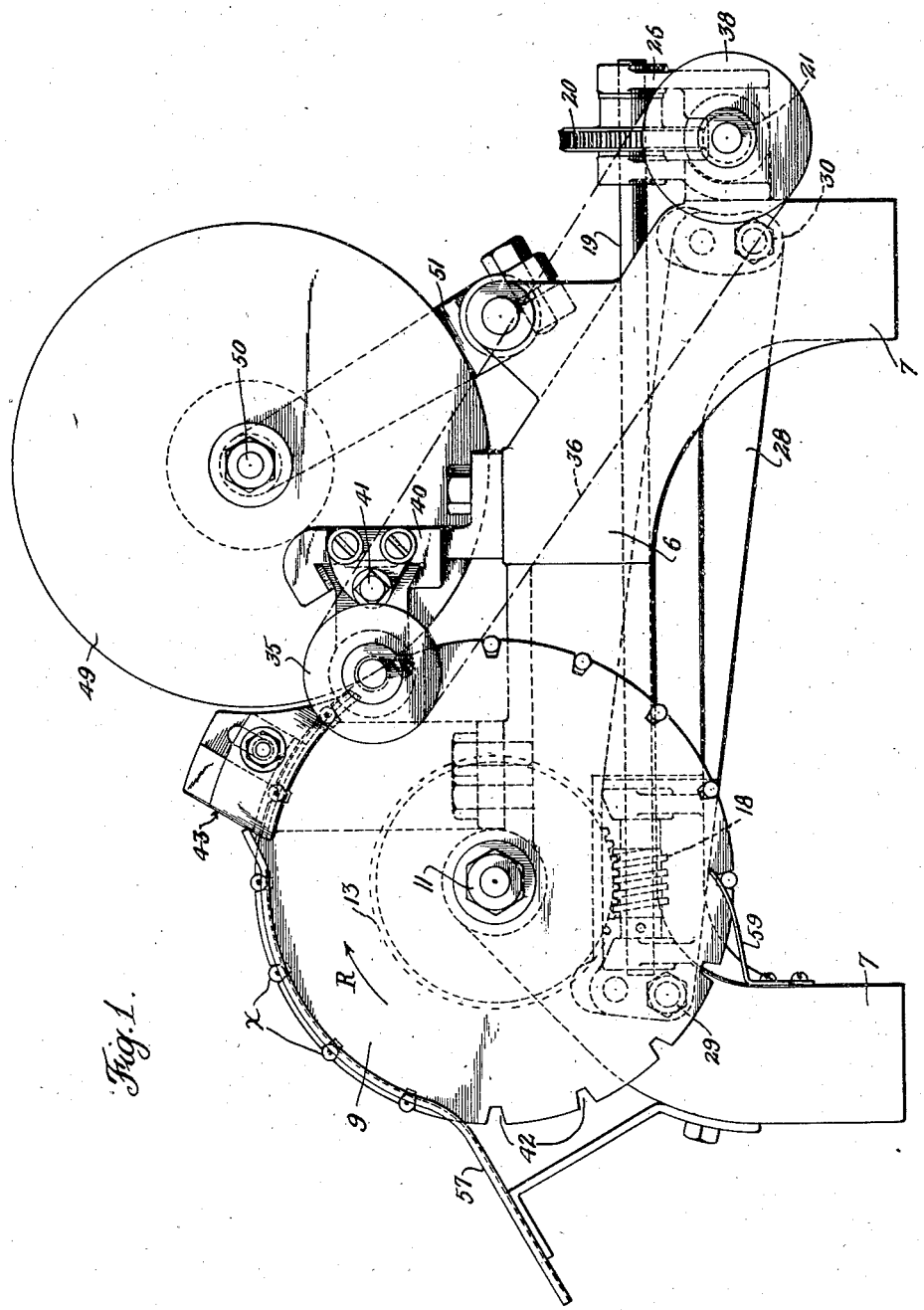
Figure 1 is a side elevational view of the machine tool of this invention.
Figure 2:
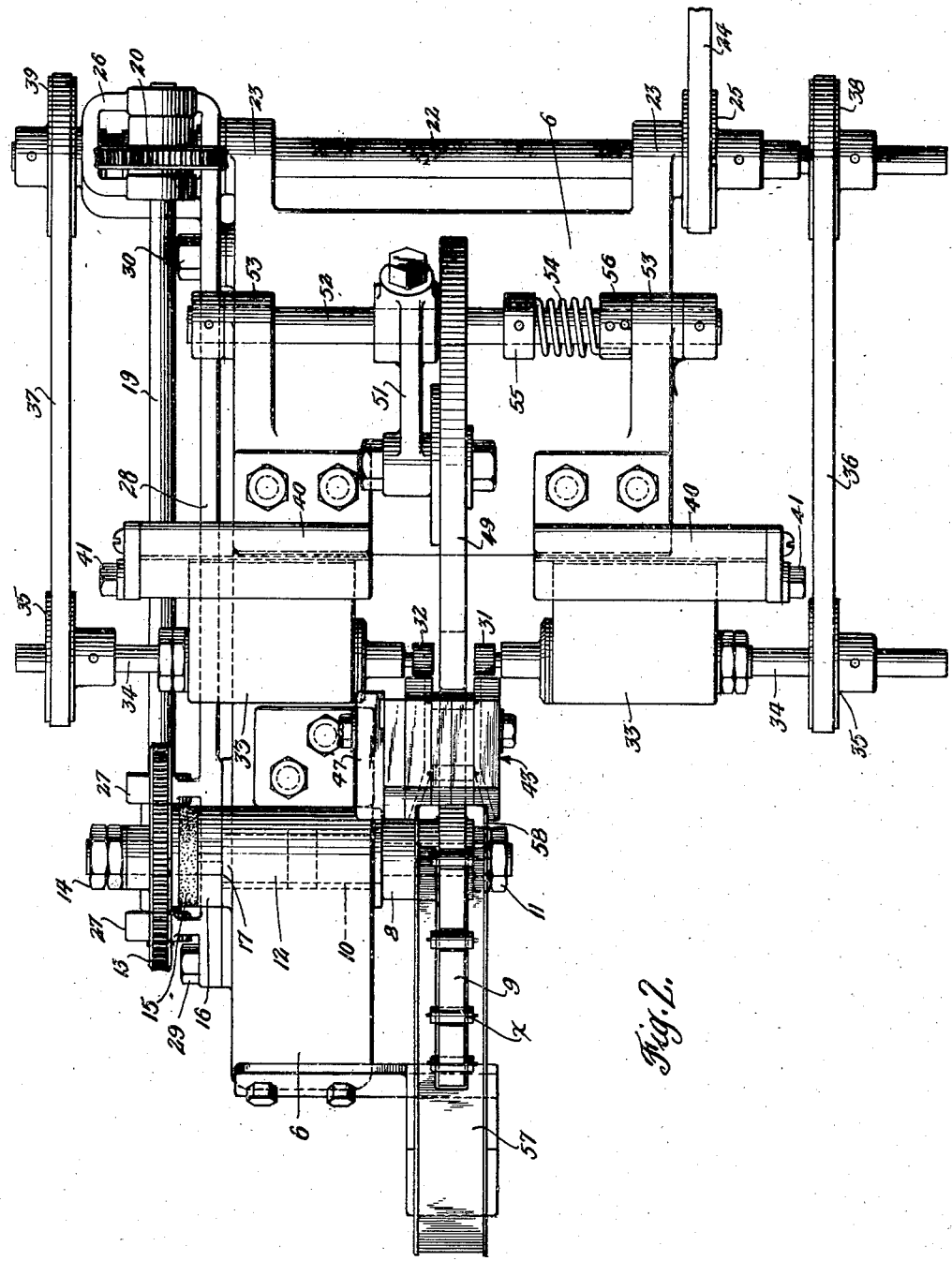
Figure 2 is a top plan view of the machine.

The base framing of the machine is indicated in Figures 1 and 2 by the numeral 6, this base framing having appropriate supporting feet as indicated at 7—7 in Figure 1. The hub 8 of the carrier wheel 9 is secured on a reduced end of the mounting shaft 10 by means of one or more nuts 11, shaft 10 being carried in a single journal 12 of appreciable length. This mounting of the carrier wheel enables ready removal and replacement of the wheel, so that wheels of different widths and having different arrangement and shape of stations may readily be employed.

At the opposite end of the mounting shaft for the carrier wheel, a worm wheel 13 is arranged, this wheel being rotative on the shaft but being tightened by one or more nuts 14 against a fiber or other friction ring 15. The friction ring 15, in turn, bears against a metal ring 16 which is keyed to the mounting shaft and which abuts a shoulder at 17, which shoulder is formed on the mounting shaft 10. In this way the drive to the carrier wheel is transmitted only through the frictional interengagement of the parts 13, 15 and 16, and this arrangement of parts constitutes a torque limiting connection, the purpose of which is to avoid damage to the machine in the event of jamming of a work piece at the periphery of the carrier wheel.

Power is supplied to the worm wheel 13 from a worm 18 carried by an adjustable shaft 19. which shaft, in turn, carries another worm wheel 20 meshing with a worm 21, the latter being mounted on the power shaft 22. Shaft 22 is journalled as at 23—23 and may be driven in any suitable manner as by the belt and pulley 24—25.

The adjustable shaft 19 is journalled in a yoke or box 26 which is mounted on and freely movable about the axis of the power shaft 22. In this way the adjustable shaft 19 is free to be swung upwardly or downwardly without impairing the proper intermeshing position of the worm wheel 20 with the worm 21. This provides for accommodation of worm wheels of different size in the position of worm wheel 13 which is mounted on the shaft 10 for driving the carrier wheel 9. The movable end of shaft 19 is journalled in bearings 27—27 carried by an arm 28 which is rigid with the yoke 26 in which the other end of shaft 19 is mounted.

Adjustment of the arm 28 and thus of shaft 19 may be effected by removal of studs 29 and 30 which are tapped into the base frame 6 through appropriate pads. A plurality of threaded apertures for receiving studs 29 and 30 may be provided in order to firmly secure arm 28 in different positions. If desired, the arm may be provided with an elongated aperture so as to provide for adjustment in small increments.

The important features in the arrangement and shape of the carrier wheel 9 will be discussed more fully hereinafter, but it is here pointed out that the drive mechanism is arranged to drive one or more cutters or other working elements, such as the pair of cutters indicated at 31—32. Each of these cutters is journalled in a housing 33 from the outer end of which the cutter driving shaft 34 projects to carry a pulley 35. Belts 36 and 37 cooperate with pulleys 35 and are driven from pulleys 38 and 39 mounted on the power shaft 22. It may be noted that pulley 39 for belt 37 is fixed on the power shaft 22 on an extension of that shaft beyond the yoke 26 which supports the gearing for driving the carrier wheel.

Each of the bearings 33 for mounting the cutters 31 and 32 is adjustably carried by a bracket 40 having a dovetail groove with adjustment parts, including an adjustment nut 41 by means of which the entire bearing housing 33 and the cutter carried thereby may be moved inwardly and outwardly. The details of this bearing 33 and the supporting and adjustment mechanism therefor are not described or illustrated in detail since these features form no part of the present invention per se.

Turning now to the structure of the carrier wheel 9, it is first noted that it is contemplated that wheels of different types and shapes shall be employed in the handling of different work pieces. For the type of part shown in the drawings, i. e., short cylindrical pieces $x$, a relatively thin disc may serve the purpose of the carrier wheel 9, the thickness of the disc being somewhat less than the length of the pieces being handled, whereby the ends of the work pieces project beyond the sides of the carrier wheel for engagement with the cutters 31—32 when the several stations bring the pieces to the cutters.

For the purpose of handling work pieces of the type just mentioned, the carrier wheel is desirably notched peripherally to provide the desired number of stations. These notches are indicated at 42 and it will be noted that the side walls of each notch are mutually inclined so as to grip the cylindrical surface of the pieces $x$ when they are inserted and pushed into the notches. The notches 42 are also so proportioned that each work piece projects somewhat beyond the periphery of the wheel, the importance of which will appear shortly below.

Figure 4:
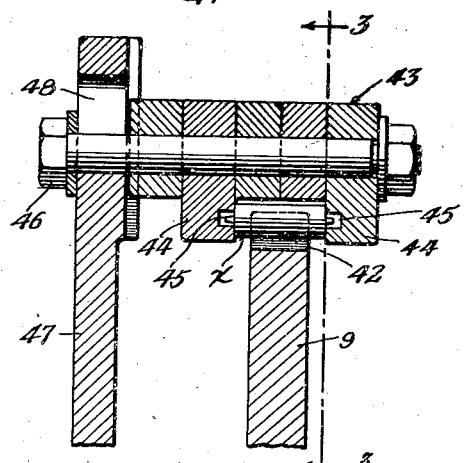
Figure 4 is a transverse sectional view taken substantially as indicated by the section line 4—4 on Figure 3.
Figure 5:
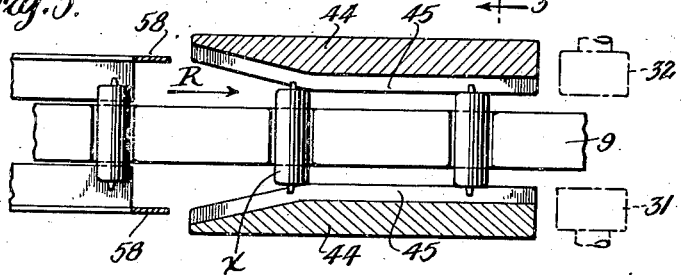
Figure 5 is a developed sectional view taken substantially as indicated by the line 5—5 on Figure 3.

The carrier wheel 9 is arranged to rotate in the direction indicated by the arrow R and is exposed in that quadrant in which the notches move upwardly from the horizontal to the vertical position, so as to provide for ready access to the wheel and thereby facilitate insertion of the work pieces into the stations. As the high point is passed, the work pieces $x$ are carried into a guide device generally indicated at 43. This guide device is desirably made up of several parts, the shape of which parts will differ depending upon the size and shape of the particular work piece being machined. Assume that the work piece is of cylindrical shape and has burrs at opposite ends, which burrs are to be removed by the cutters 31—32, the guide device desirably includes a pair of counterpart members 44—44, each having a groove 45 in its lateral face presented toward the wheel to accommodate the burrs without engagement therewith, as is clearly illustrated particularly in Figures 3, 4 and 5. These guide members 44 also desirably are flared at their entrance ends to provide a bell-mouth so that the guides serve to accurately position the work pieces in a direction transverse the plane of rotation of the carrier wheel. It may be noted that this construction provides for accurate guiding of the work pieces without engagement with the projecting burrs, this being of advantage since burrs of this type are commonly irregular.

The guide device 43 is mounted as by means of a through bolt 46 on an upright bracket 47 carried by the base. Adjustability of the guide is provided for as by a slot 48 formed in bracket 47.

Figure 3:
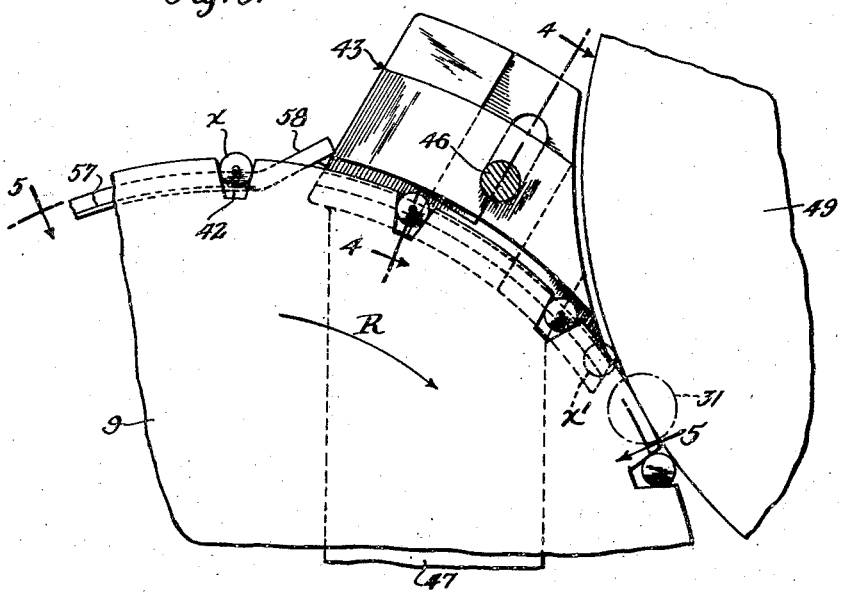
Figure 3 is an enlarged fragmentary side elevational view of certain parts of the carrier wheel, guide device and retaining disc, this view being taken substantially as indicated by the line 3—3 on Figure 4.

As each work piece is carried through the guide it is properly positioned transversely of the wheel and before the work piece actually leaves the lateral guide surfaces, for instance at the position indicated at $x'$ in Figure 3, the piece is engaged by the periphery of a rotative member 49, which rotative member is yieldingly urged against the carrier wheel and therefore securely holds the work pieces in their notches or stations during the time they pass the cutters 31—32. This relationship is clearly indicated in Figure 3.

The rotative member or retaining disc 49 is desirably made of relatively hard plastic or fibrous material and is mounted on a shaft 50 carried by an arm 51 which projects upwardly from a shaft 52 journalled on the base as at 53—53. A torsion spring 54, one end of which is connected with collar 55 and the other with the collar 56, yieldingly urges the arm 51 and thus the retaining disc in a direction toward the carrier wheel, for this purpose the collar 55 being secured to shaft 52 and collar 56 being held non-rotative.

In the region in which the carrier wheel is exposed for insertion of the work pieces into the peripheral stations, a trough 57 is arranged, this trough being slotted out in the central region so that the wheel 9 projects therethrough. The trough has its lower end extended downwardly and then in a direction away from the wheel so as to carry away any work pieces which may have been dropped or improperly placed in the stations. At its upper forward end, the entire base of the trough is cut out, as will be seen from inspection of Figures 2 and 5, in order to pass the work pieces $x$ as they move into the guide 43. The side flanges 58—58 are desirably extended to abut against or be fastened to the guide 43 in order to give support to the trough, as is clearly shown in Figure 3.

As the work pieces pass between the cutters 31—32 and then move downwardly, they may drop out of their stations by gravity toward the bottom of the wheel, but if they do not drop out, pairs of stripper fingers such as indicated in Figure 1 at 59 will serve to displace the finished pieces. In this connection it may be noted that the arrangement of the base and supporting framing, including the spaced feet 7—7 is such as to accommodate a tray below the wheel for the reception of finished pieces.

In connection with the discharge of finished pieces, for instance into a tray as referred to above, it may be mentioned that the trough 57 is of importance in avoiding the inadvertent dropping of work pieces downwardly into the tray of finished pieces.

The operation of the machine should be clear from the foregoing description. However, reference is here made to several important features and arrangements of parts.

First note that the zone in which the carrier wheel is exposed for insertion of the work pieces is such that the pieces will remain in their notches by gravity during the upward and forward movement which brings the pieces into the guide device 43. Moreover, it is of importance that the axes of the carrier wheel, cutters and retaining disc are all substantially parallel and all lie substantially in a common plane which is inclined from the horizontal, with the axis of the retaining disc 49 located above those of the cutters and of the carrier wheel. In this way the retainer disc engages the work pieces in their downward movement from the high point of the wheel prior to the zone in which the pieces would have a tendency to drop out under the action of gravity.

It is also important that the guide device 43 and retainer disc 49 are relatively arranged so that the periphery of the disc engages the work pieces prior to the time the work pieces leave the delivery end of the lateral guiding surfaces of the guide device.

The machine tool of this invention is highly flexible in the sense that it is readily adaptable to the handling of a wide variety of parts. The several adjustable devices are all conveniently arranged for quick adjustment or replacement. For instance, the cutters may readily be moved to a different position and since the carrier wheel is mounted on only a single bearing and is not blocked in by framing at its outer side, this wheel may readily be taken off and replaced by a wheel of different shape prepared to handle another type of work piece. It will be understood that somewhat differently shaped guide devices 43, troughs 57 and strippers 59 may be required for different work pieces. It is further of advantage that for at least most pieces for which the machine is adapted, no change in the retainer disc 49 need be made. The yielding mounting for the retainer disc will accommodate a wide variety of shapes of work pieces. With respect to the retainer disc 49, it is of advantage that this disc receives its drive solely by engagement with the carrier wheel and the work pieces carried thereby. As a result, the pieces are very accurately held in their stations as they pass between the cutters.

It will be understood that operations of quite a variety of types may also be performed. The mechanism is not only adapted for the removal of burrs, but also for other operations, particularly where the length of a small part is to be accurately cut. Even certain types of grooving operations may be performed.

I claim:

1. In a machine tool having a cutter or other working element, a carrier wheel having a plurality of stations adjacent the periphery thereof for the reception of work pieces to be carried past the cutter, and drive mechanism for the carrier wheel including a power shaft carrying a worm, an adjustable shaft carrying a worm wheel cooperating with said worm, the adjustable shaft being mounted for swinging movement about the axis of the power shaft with said worm and worm wheel interengaged, a second worm carried by the free end of the adjustable shaft, and a second worm wheel operatively connected with the carrier wheel, and adjustable means for mounting the free end of said adjustable shaft in different positions with reference to the axis of said second worm wheel, whereby to accommodate worm wheels of different diameter in the position of said second worm wheel and thereby provide for variation in the rate of drive of the carrier wheel.

2. In a machine tool having a cutter or other working element, a carrier wheel having a plurality of stations adjacent the periphery thereof for the reception of work pieces to be carried past the cutter, and drive mechanism for the carrier wheel including a power shaft, an adjustable shaft, gearing interconnecting said shafts, mounting means for the adjustable shaft providing for swinging thereof about the axis of the power shaft with said gearing remaining in mesh, replaceable gearing for operatively interconnecting the free end of the adjustable shaft and the carrier wheel, and adjustable means for mounting the free end of the adjustable shaft in different positions to accommodate gearing of different ratios, whereby to provide for drive of the carrier wheel at different rates.

3. In a machine tool, the combination of a driven carrier wheel having a series of circumferentially spaced outwardly flaring notches constituting stations for work pieces which project radially beyond the periphery of the wheel, a cutter mounted adjacent the path of movement of the work pieces in position to perform work thereon, and a retainer wheel mounted so that it has peripheral surface contact with its pieces and with the periphery of the carrier wheel between stations, thereby providing for frictional drive of the retainer wheel by the carrier wheel, said retainer wheel being yieldingly mounted to ride over and press against the pieces to wedge them into said flaring stations and hold them against movement while they are being carried past the cutter, and the cutter comprising a rotatable member the axis of which lies in a horizontal plane between the horizontal plane in which the axis of the carrier is located and the horizontal plane in which the axis of the retaining wheel is located, all of said axes being parallel with the carrier axis in the lowest position.

4. In a machine tool, the combination of a driven carrier wheel having a series of circumferentially spaced outwardly flaring notches constituting stations for work pieces which project radially beyond the periphery of the wheel, a cutter mounted adjacent the path of movement of the work pieces in position to perform work thereon, and a retainer wheel mounted so that it has peripheral surface contact with its pieces and with the periphery of the carrier wheel between stations, thereby providing for frictional drive of the retainer wheel by the carrier wheel, said retainer wheel being yieldingly mounted to ride over and press against the pieces to wedge them into said flaring stations and hold them against movement while they are being carried past the cutter, and the mounting for the retaining wheel including a pivoted arm providing for swinging movement thereof for accommodating carrier wheels of different diameters.

FREDERICK W. HENKE.